United States Patent [19]

Mazac et al.

[11] 3,721,768

[45] March 20, 1973

[54] GROUND START ADAPTER UNIT

[75] Inventors: Frank P. Mazac, Santa Ana; Alan R. Fitzsimons, Laguna Beach, both of Calif.

[73] Assignee: San/Bar Corporation, Santa Ana, Calif.

[22] Filed: Oct. 4, 1971

[21] Appl. No.: 186,270

[52] U.S. Cl...........179/16 F, 179/16 EC, 179/18 AD

[51] Int. Cl...........H04m 1/50

[58] Field of Search.179/16 A, 18 AD, 16 R, 16 AA, 179/16 E, 16 EA, 16 F, 16 EC

[56] References Cited

UNITED STATES PATENTS

| | | | |
|---|---|---|---|
| 3,639,696 | 2/1972 | Chambers, Jr. | 179/16 F |
| 3,538,260 | 11/1970 | Brouwer | 179/16 E |
| 3,506,789 | 4/1970 | Brockschmidt et al. | 179/18 AD |
| 2,552,780 | 5/1951 | Hadfield | 179/16 E |

*Primary Examiner*—Ralph D. Blakeslee
*Assistant Examiner*—Randall P. Myers
*Attorney*—Harold L. Jackson

[57] ABSTRACT

A ground start adapter unit for use with telephone systems is disclosed. The ground start adapter unit serves to enable peripheral telephone units that are designed for loop start operation to be employed with telephone systems designed for ground start operation. The unit generally operates by responding to the application of ground potential to either a tip or ring conductor from a central office or subscriber facility, respectively. A ground start adapter unit thus includes circuitry for detecting ground potential applied to either one of the conventional tip and ring conductors from either a central office or from a subscriber facility. Also included is circuitry for detecting a loop condition at the subscriber facility and circuitry for tripping the transmission of ringing signals from the central office when the subscriber facility is in an off-hook condition. A reversal circuit operates to detect any polarity reversal of the line conductors from the central office and effect a corresponding reversal of the line conductors connected to the subscriber facility.

18 Claims, 2 Drawing Figures

GROUND START ADAPTER UNIT

BACKGROUND OF THE INVENTION

1. Field of the Invention

This invention generally relates to equipment suitable for use in conjunction with telephone systems. More particularly, the present invention concerns a ground start adapter unit which permits or adapts certain equipment that is designed for loop start operation, i.e., long line adapters, etc., to be used in a telephone system designed for ground start operation.

2. Description of the Prior Art

Telephone systems typically may involve either a ground start or loop start mode of operation. The ground start mode of operation simply involves the application of ground potential to the tip line conductor by a central office facility to initiate a call to a subscriber facility. Similarly, ground potential is applied to the ring line conductor when a call is initiated at the subscriber facility. Equipment that is physically situated intermediate the central office and the subscriber facility, accordingly, should be responsive to the appropriate application of ground potential to the telephone line conductors when operative with a system designed for ground start operation. A telephone system in which the subscriber facility includes a private branch exchange (PBX) is exemplary of systems using a ground start mode of operation.

Loop start operation is the mode of operation that is common to most ordinary telephone facilities and involves a looping (interconnection) of the tip and ring line conductors at either the central office or the subscriber facility when a call is being initiated. Equipment connected intermediate the central office and the subscriber need thus be responsive to a looping of the telephone lines. Generally considered, equipment designed for loop start operation is not suitable for use with a system designed for ground start operation without being adapted for such use by, for example, the addition of some unit that will appropriately enable ground start operation. An example of equipment designed for loop start operation, and therefore requiring a ground start adapter unit when used with ground start systems, are the long line adapter circuits described in copending patent applications Ser. No. 42,190, filed June 1, 1970, entitled Long Line Adapter Circuit and Ser. No. 86,039, filed Nov. 2, 1970, entitled Long Line Adapter Circuit Usable with Increased Power Supply, both of which are owned by the assignee of the subject patent application. A ground start adapter unit would be used in conjunction with the above-mentioned long line adapter circuits where a central office facility is connected to an extra distant PBX.

Accordingly, it is the intention of the present invention to provide a ground start adapter circuit that operates to allow equipment designed for loop start operation to be used in a telephone system designed to have a ground start mode of operation.

SUMMARY OF THE INVENTION

Briefly described, the present invention involves a ground start adapter unit that serves to enable certain equipment designed for loop start operation to be used in a system designed for ground start operation. More particularly, the subject ground start adapter unit is particularly employable in conjunction with long line adapter circuits designed for loop start operation.

Specifically, the subject ground start adapter unit is adapted to be connected between a central office and a PBX, or other equipment that may be operated in a ground start mode, and in parallel with a long line adapter or other equipment to be used in a system designed for ground start operation. A ground start adapter unit, accordingly, may include ground signaling circuitry responsive to the appropriate application of ground potential to the tip and ring line conductors by the central office, or the subscriber facility, for signaling the distant equipment that such ground potential is present, circuitry responsive to the looping of the tip and ring lines by the subscriber facility for effecting a complete connection of the lines between the central office and the subscriber facility, and reversal circuitry for reversing the polarity of the subscriber lines in response to a corresponding polarity reversal of the central office lines. Auxiliary ringing control circuitry may be provided to augment the ring trip circuitry of a long line adapter being adapted or assisted. After interconnection of the telephone lines between the central office and the subscriber PBX, through the long line adapter circuit, remaining standard signaling functions are performed in the conventional manner by the equipment at the central office and the PBX, and by the long line adapter.

The many attendant advantages of the invention will be more readily appreciated as the same becomes better understood by reference to the following detailed description which is to be considered in connection with the accompanying drawings wherein like reference symbols designate like parts throughout the figures thereof.

DESCRIPTION OF THE PREFERRED EMBODIMENT

Figure 1:
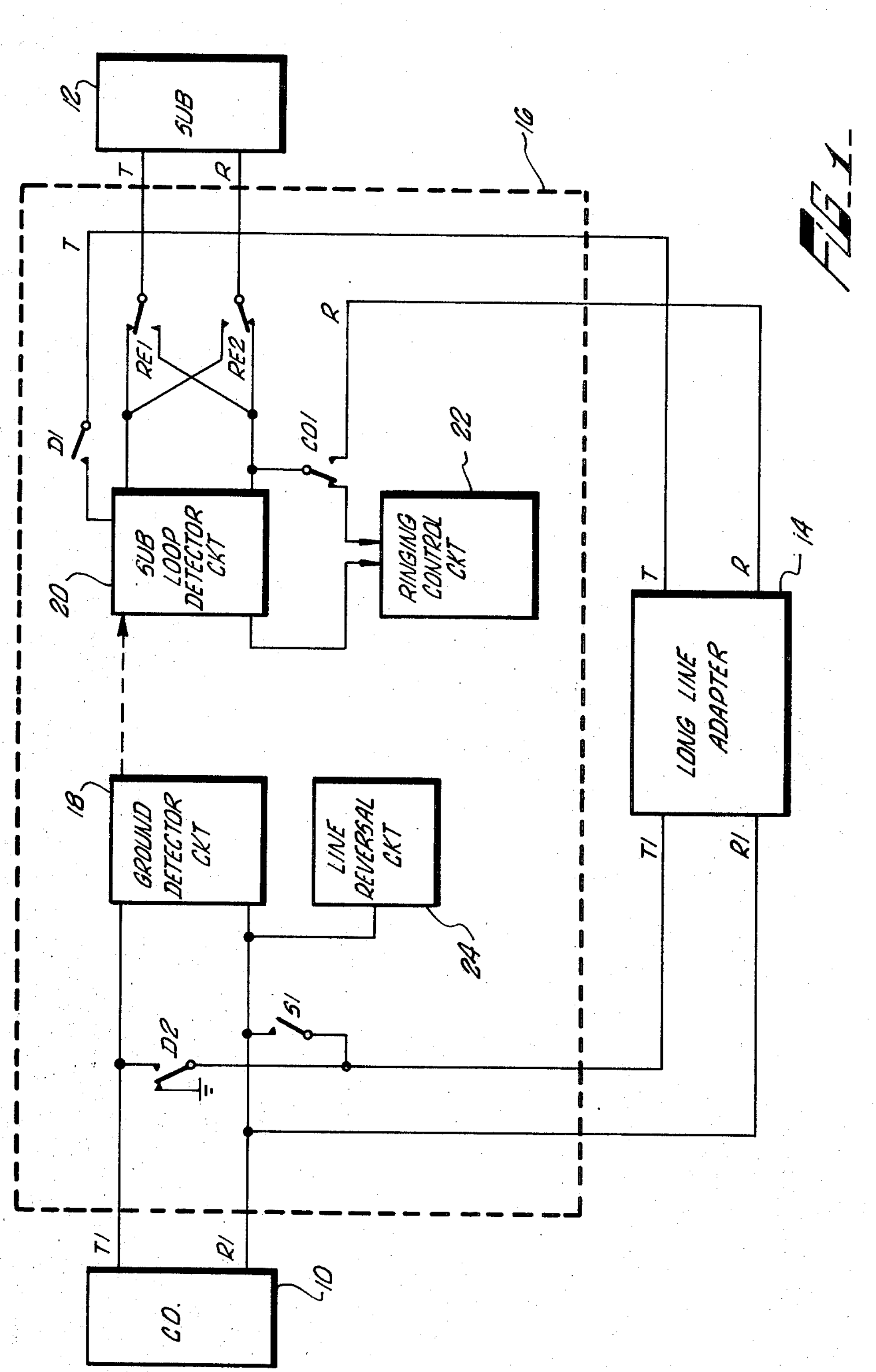
FIG. 1 is a general functional block diagram illustrating an embodiment of a ground start adapter unit operatively connected to a long line adapter.

Referring to FIG. 1, an exemplary telephone system in which a ground start adapter unit may be required would involve a central office 10 having a conventional pair of tip and ring line conductors designated T1 and R1 adapted for operative connection to a subscriber facility 12 such as a PBX that is designed for ground start operation and which also has a conventional pair of tip and ring line conductors designated T and R. The system would also include an intermediately situated unit, such as a long line adapter 14, through which the central office 10 and the subscriber facility 12 are connected during operation and which is designed for loop start operation.

A ground start adapter unit 16 which serves to adapt the intermediately placed equipment for ground start operation is designed to be effectively coupled in parallel therewith, i.e., the long line adapter 14, and essentially operates to detect when either the central office 10 or the subscriber PBX 12 is signaling the other at the start or commencement of a telephone call. Detected ground start signals are effectively relayed to the distant station. Upon the distant station answering the call or ground start signal by the receiver thereof being converted to an off-hook condition, the ground start adapter 16 completes the connection of the tip and ring lines of both the central office 10 and the subscriber 12 through the long line adapter 14. The alternative to using a ground start adapter is the employment of other suitable equipment.

As shown, the ground start adapter 16 includes a central office ground detector circuit 18 which is connected to the central office line conductors T1 and R1 to detect the application of ground potential to the tip conductor T1 from the central office 10 when a call is originated there. Upon such detection, a number of switching contacts, including a contact CO1 are operated to relay the start signal to the subscriber facility 12. The expected response is the lift-off of the subscriber receiver to produce an off-hook condition and a consequent looping of the subscriber tip and ring conductors T and R. A subscriber loop detector circuit 20, which is effectively enabled by the ground detector circuit 18, serves to detect this looping of the conductors T and R by the subscriber equipment and operates to close connecting contacts D1 and D2 to complete the connection of the central office 10 to the subscriber facility 12 through the long line adapter 14. A ringing control circuit 22 is subsequently operated to terminate the transmission of ringing signals from the central office 10 over the line conductors T1 and R1. This is accomplished by closure of a contact S1 which effectively serves to interconnect the T1 and R1 conductors.

It is sufficient to point out at this juncture that the conductors T1 and R1, as well as the conductors T and R, are suitably interconnected internal to the long line adapter 14 and further that the central office 10 and the subscriber 12 are electrically interconnected through the long line adapter 14 by a transformer having coils to which the respective conductors of the central office 10 and the subscriber facility 12 are connected.

In that a detailed and comprehensive description of the structure and operation of the long line adapter 14 is included in each of the above-referenced copending applications, no further description of such apparatus is considered to be necessary for an understanding of the subject ground start adapter unit and is accordingly omitted herefrom.

Calls originating at the subscriber facility 12 are attended by the application of ground potential to the subscriber ring conductor R as a ground start signal. The ringing control circuit 22 operates to detect the application of ground potential and responds by closing the contact S1. The contact closure effectively transmits the ground start signal to the central office 10. Automatically operated relay equipment at the central office 10 produces a looping of the conductors T1 and R1 such that the ground potential is effectively returned to the ground start adapter 16 over the tip conductor T1 and hence sensed by the ground detector circuit 18. As earlier described, the loop detector circuit 20 is enabled and accordingly detects the already completed looping of the subscriber tip and ring conductors T and R. The connecting contacts D1 and D2 are, as a result, closed and the central office 10 and the subscriber facility 12 are again connected through the long line adapter 14 to permit conventional operation.

To meet certain functional requirements, the central office 10 may cause a polarity reversal of the tip and ring conductors T1 and R1. This polarity reversal is oftentimes referred to as a line reversal, as is to be the case in the following description. As an example, a line reversal at the central office 10 may be used to control the operation of signaling lights at the subscriber facility 12 when a PBX is involved. A line reversal is also commonly attendant to the operation of tolling equipment used by telephone companies to monitor the time duration of telephone calls for which a toll is to be levied. Such a reversal at the central office 10 requires that a corresponding line reversal occur at the subscriber facility 12 with respect to the tip and ring conductors T and R. Accordingly, the ground start adapter unit 16 may include a line reversal circuit 24 which detects a line reversal by detecting the application of ground potential to the ring conductor R1 from the central office 10. A reversal of the subscriber conductors T and R is accomplished by operation of the contacts RE1 and RE2 under the control of the line reversal circuit 24.

Upon termination of the telephone call, the ground start adapter unit 16 is returned to its latent condition wherein each of the components of the ground start adapter unit 16 become non-operative.

Figure 2:
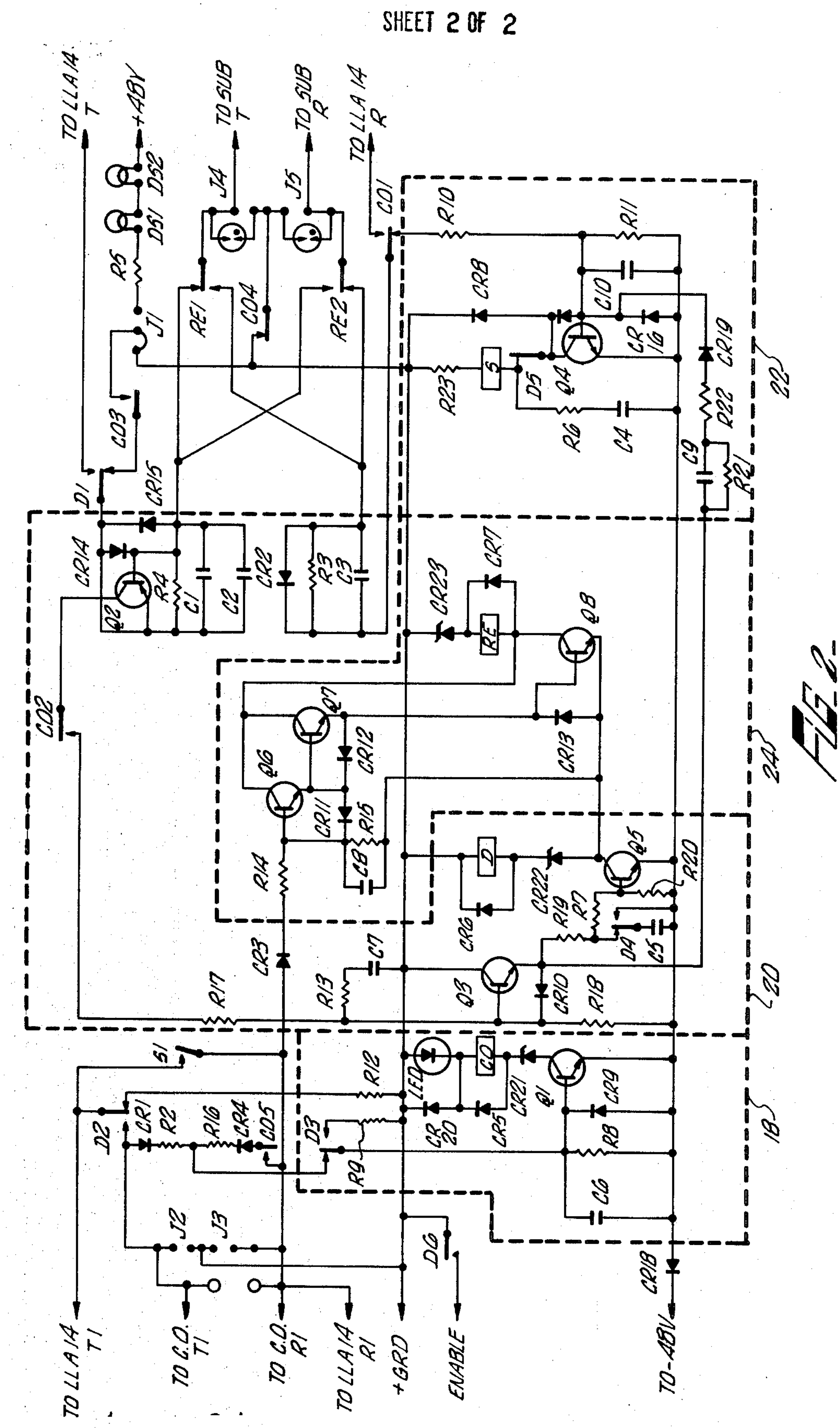
FIG. 2 is a detailed schematic circuit diagram illustrating a ground start adapter unit in accordance with the present invention.

A more detailed understanding of a ground start adapter unit 16 may be had by reference to the schematic circuit diagram of FIG. 2. Broken lines have been provided to generally delineate the elements included in the respective component portions, i.e., ground detector circuit 18, subscriber loop detector circuit 20, ringing control circuit 22, and line reversal circuit 24, of a ground start adapter unit 16.

Considering first a telephone call which is originated at the central office 10, a ground start signal (ground potential) is applied by standard equipment at the central office 10 to the tip conductor T1 and is transmitted via a path including a diode CR1, a resistor R2, and a contact D3 to the base of a transistor Q1 which is thereby rendered conductive. A relay coil CO, connected in series with the transistors Q1, is energized whenever the transistor Q1 is conductive. A series of relay contacts C01, C02, C03, CO4, and C05 are consequently operated. It is to be noted that all relay contacts shown in the Figures are illustrated in latent or normal positions, energization of the associated relay coil producing operation thereof.

The contact C01, when operated, connects the ring conductor R of the subscriber facility 12 to the long line adapter 14 to permit ringing voltages from the long line adapter 14 to be applied to the subscriber facility 12 via a path including the contact C01, a resistor R3 and the contact RE2. The relay contact C02 operates to prime the subscriber loop detector circuit 20 for operation upon the subscriber conductors T and R being looped by lift-off of the conventional receiver at the subscriber facility 12. The relay contact C03 operates to apply ground potential to the tip conductor T via a path including a patchboard J1, the contact CO3, the contact D1, a resistor R4 and the contact RE1. The contact C04 operates to remove ground Ordinary signaling such as dialing may now take place. A combination of a resistor R13 and a capacitor C7 connected in the collector circuit of the transistor Q3 prevent undesired switching of the transistor Q3 during dialing. The relay D is accordingly maintained continuously energized for the duration of a telephone call.

Coincident with the answering by the central office 10 of a call initiated at the subscriber facility 12, the polarity of the central office conductors T1 and R1 may be reversed to have a positive ground potential applied to the ring conductor R1 and a negative potential applied to the tip conductor T1. This condition is, as was earlier mentioned, a line reversal. The positive potential applied to the ring conductor is transmitted to the base of a transistor Q6 through a path including a diode CR3 and a resistor R14. The transistor Q6 is connected in a Darlington configuration with two further transistors Q7 and Q8 which are together rendered conductive by the presence of ground potential on the central office ring conductor R1. A slight time delay is provided by a parallel connected resistor R15 and capacitor C8. A relay coil RE is by conduction of the transistor Q8 energized and the contacts RE1 and RE2 are operated to have the positions thereof reversed. The subscriber tip and ring conductors T and R are hence reversed to correspond to the line reversal initiated at the central office 10.

False operation of the line reversal circuit 24 during the transmission of ringing current, on calls originated at the central office 10, is prevented by having the emitter of the transistor Q8 coupled to receive negative potential via the transistor Q5. This requires that loop sensing (of the subscriber conductors T and R) be completed before the relay coil RE may be energized. Otherwise stated, a line reversal of the subscriber lines T and R may not be completed until both the central office 10 and the subscriber facility 12 have been completely connected through the long line adapter 14 by the ground start adapter unit 16. It is noted, however, that a reversal of the central office conductors T1 and R1 may occur earlier. A resistor R16 and a diode CR4 are hence provided to ensure continued energization of the relay CO in the ground detector circuit 18.

Protection against lightning may be provided by gas filled, surge voltage, protectors. To this end, patchboards J2 and J3 may be provided at the central office tip and ring conductor terminals and patchboards J4 and J5 may be provided at the subscriber tip and ring terminals of the ground start adapter unit 16 to accommodate the protectors or lightning arresters. Since lightning damage typically may result from voltage surges induced on transmission lines struck by lightning, protectors need only be used at the terminals directly connected to the transmission lines. For example, if the ground start adapter unit 16 is physically installed in proximity to the central office 10, then a pair of protectors P1 and P2 may be employed at the patchboard units J4 and J5. Conversely, if the ground start adapter unit 16 is physically installed in proximity to the subscriber facility 12, protection is only required on the central office side of the unit and the protectors P1 and P2 would be placed at the patchboards J2 and J3 if desired for protection.

As earlier mentioned, a contact C04 may be provided in the ground connection of the line arresters J4 and J5 to permit the ground connection to be disconnected whenever the ground detector circuit 18 is operated. This disconnection serves to prevent the high voltages employed during ringing from breaking over to produce conduction of the transistor Q4 and thereby cause a false ring trip.

Each of the relays CO, D, RE and S are provided with parallel connected arc suppression diodes CR5, CR6, CR7 and CR8, respectively. High voltage transient protection for the various transistors Q1 to Q8 are provided by the use of a plurality of diodes CR9 to CR17, as illustrated.

A diode CR18 serves as a blocking diode to protect the ground start adapter unit from damage caused by an inadvertant power reversal.

As a practical measure a light emitting diode LED may be used to provide a busy indication. A repairman looking at the ground start adapter unit may then readily determine when the telephone circuit connected through the ground start adapter unit is in use.

As another practical expedient, a plurality of zener diodes CR21 to CR23 may be connected in series with the relay coils CO, D and RE, respectively, for the purpose of limiting the voltage applied thereto. This practice solves any requirement for relay coils having a higher voltage rating and enables the use of less expensive relays with lower voltage ratings.

By way of example, but not in a limiting sense, elements having the below enumerated values or types may be used in a ground start adapter unit in accordance with the present invention.

| | |
|---|---|
| Resistors R2, R9, R19, R16 | 15 kilohms |
| Resistors R3, R4 | 51 ohms |
| Resistors R5, R12 | 600 ohms |
| Resistors R6, R8, R11 | 330 ohms |
| Resistors R7, R13, R20, R21 | 10 kilohms |
| Resistor R14 | 330 kilohms |
| Resistor R15 | 22 kilohms |
| Resistor R17 | 150 kilohms |
| Resistor R18 | 1 megohm |
| Resistor R19 | 39 kilohms |
| Resistor R22 | 100 ohms |
| Resistor R23 | 2.2 kilohms |
| Capacitors C1, C2 | 1000 microfarads |
| Capacitors C3 | 65 microfarads |
| Capacitors C4, C6, C10 | 50 microfarads |
| Capacitors C5, C8 | 5 microfarads |
| Capacitor C7 | 2 microfarads |
| Capacitor C9 | 25 microfarads |
| Diodes CR1 to CR20 | Type IN4002 |
| Diodes CR21 to CR23 | Type In4747 |
| Transistors Q1 to Q8 | Type 2N3568 |
| Light Emitting Diode LED | Type FLD102 |

From the foregoing detailed description, it is now apparent that the present invention provides a telephone adapter unit that operates to permit certain devices which are designed for loop start operation, such as the particularly mentioned long line adapter, to be used in telephone systems designed for ground start operation.

It is to be understood that the references to central office and subscriber equipment made hereinabove are intended as references to standard equipment, well known in the prior art, and accordingly not warranting any detailed explanation herein.

While a preferred embodiment of the present invention has been described hereinabove, it is intended that all matter contained in the above description and shown in the accompanying drawings be interpreted as illustrative and not in a limiting sense and that all potential from lightning arrester circuit provisions during operation of the ground start adapter. The contact C05 connects a serially coupled diode CR4 and resistor R16 to the ring conductor R1 to accommodate line reversals as is later discussed.

The patchboard J1 serves to enable application of a +48 volt potential to the tip conductor T, as an alternative to ground potential, whenever 96 volt operation is used for the telephone system in place of 48 volt operation. The +48 volt power source would be connected to the patchboard J1 via a current limiting combination of a resistor R5 and a pair of lamps DS1 and DS2.

Looping of the subscriber conductors T and R at the subscriber facility 12 is detected by the loop detector circuit 20 when a transistor Q2 is rendered conductive. Conduction of the transistor Q2 is followed by a transistor Q3 also becoming conductive. Any imbalance in the telephone lines caused by the transistor Q2 being directly connected in the tip conductor T is balanced by the inclusion of a diode CR2 in the ring conductor R. A pair of capacitors C1 and C2 connected in parallel with the transistor Q2, serve to provide a very low impedance path to ringing current and thereby counter the possibility of false switching of the transistor Q2 by the ringing current. The capacitors C1 and C2, along with a capacitor C3, connected in parallel with the diode CR2, are intended to also provide insertion loss compensation.

Conduction by the transistor Q3 enables the ringing control circuit 22 by switching a transistor Q4, included therein, into conduction. The transistor Q3 also serves to render conductive a transistor Q5 of the loop detector circuit 20.

Operation of the ringing control circuit 22 by the conduction of the transistor Q4 serves to energize a relay coil S. The relay contact S1 is accordingly closed to effectively interconnect the tip and ring conductors T1 and R1 of the central office. This interconnection operates as a ring trip, or otherwise stated, functions to terminate the transmission of ringing signals from the central office 10. The usually desired operational delay in terminating the transmission of ringing signals is provided by a timing network formed by a series connected resistor R6 and capacitor C4 coupled between the collector and emitter terminals of the transistor Q4.

The next response to the subscriber conductors T and R being looped is the delayed operation of the transistor Q5. A timing network including a resistor R7 and a capacitor C5 is used to provide the desired delay. Conduction by the transistor Q5 operates to energize a relay coil D. The various corresponding contacts identified with a "D" are consequently operated and essentially serve to finally complete the desired connection of the central office 10 and the subscriber facility 12 through the long line adapter 14.

Specifically, the contact D1, when operated, is reversed to provide a complete path connection from the subscriber tip conductor T through a contact RE1, the resistor R4 and the contact D1 to the subscriber tip line of the long line adapter 14. The contact D2 is also reversed in position and directly connects the tip conductor T1 of the central office 10 to the C0 tip line of the long line adapter 14.

The contact D3 has the position thereof reversed to provide an alternate hold circuit for the relay coil C0 such that it will remain energized for the duration of any period during which the subscriber facility is in an off-hook or talk condition. The alternate hold circuit includes a resistor pair R8 and R9 which operates to maintain the transistor Q1 conductive. The resistor R8 in conjunction with a capacitor C6 also provides a timing circuit which immunizes the transistor Q1 from being responsive to transients.

A contact D4 is operated to remove the earlier mentioned RC timing network from the base of the transistor Q5.

A contact D5 serves to deactivate the ring control circuitry 22 by permitting the transistor Q4 to return to a non-conductive state and permit the contact S1 to revert to an open position. Opening of the contact S1 removes the interconnection of the tip and ring conductors T1 and R1 of the central office 10 at the ground start adapter. This is necessary to permit the signaling functions of the long line adapter 14 to be properly completed. The contact D6 may be used to provide a positive ground connection such as may be necessary for peripheral enabling or signaling purposes when desired or required.

Considering now the origination of a call from the subscriber facility 12, assume once again that the ground start adapter unit 16 is in a latent condition wherein all of the various conductors and relay contacts are in their normal position and the relay coils are unenergized. A ground start signal is initiated by the subscriber facility 12 by standard equipment therein applying ground potential to the ring conductor R. The subscriber ground start signal is provided to the ringing control circuit 22 via a path including the contact RE2, the resistor R3, the contact C01 and a resistor pair R10 and R11. The ringing control circuit 22 is thus activated by the transistor Q4 being rendered conductive by the ground start signal. The relay coil S is accordingly energized and the resulting closure of the contact S1 effects application of ground potential to the central office ring conductor R1 through a current limiting resistor R12, the contact D2 and the contact S1. As earlier mentioned, the ground signal is returned through automatically operated equipment at the central office 10 over the central office tip line T1. The returned ground potential, in the manner earlier discussed, is applied to the transistor Q1 through the path including the diode CR1, the resistor R2 and the contact D3. The resulting conduction of the transistor Q1 produces the energization of the relay coil C0.

The consequent operation of the contact C01 connects the subscriber ring conductor R to the corresponding ring conductor of the long line adapter 14 and at the same time disconnects the direct connection of the ringing control circuit 22 to the subscriber ring conductor R. The contacts C02 and C03, when operated, cause the subscriber loop detector circuit 20 to immediately detect the already completed looping of the subscriber tip and ring conductors T and R.

Despite the position of the contact C01, the ringing control circuit 22 remains operative for a brief period until the transistor Q5 becomes conductive and the relay coil D is energized to open the contact D5. As earlier discussed, energization of the relay coil D produces the final connection of the central office 10 and the subscriber facility 12 through the long line adapter 14.

modifications, constructions and arrangements which fall within the scope and spirit of the present invention may be made.

What is claimed is:

1. A ground start adapter circuit for use with telephone systems having a ground start mode of operation, the systems including a subscriber facility and a central office facility adapted to be controllably connected by a pair of line conductors through an intermediate device having a non-ground start mode of operation, said ground start adapter circuit being coupled in parallel with said intermediate device and coupled in series between said central office and subscriber facilities to adapt said intermediate device for said ground start mode of operation, said ground start adapter circuit including:

first means for detecting the transmission of ground potential signals from said central office over said conductors;

second means, responsive to operation of said first means, for detecting the interconnection of said line conductors at said subscriber facility by operation thereof, said second means effecting an operative connection of said central office and said subscriber facility to said intermediate device via said line conductors for a duration corresponding to the interconnection of said line conductors at said subscriber facility; and third means for providing a ring trip signal to said central office in response to the operation of said subscriber facility, said third means being deactivated by said second means after a selected time duration.

2. The adapter circuit defined by claim 1 further including:

reversal detector means for detecting a selected polarity condition of the line conductors connected to the central office facility; and line reversing means responsive to said reversal detector means, for adapting the line conductors connected to the subscriber facility to have a polarity corresponding to said selected polarity.

3. The adapter circuit defined by claim 1 wherein said line conductors include central office tip and ring conductors connected to the central office facility and subscriber tip and ring conductors connected to the subscriber facility, said adapter circuit further including:

reversal detector means for detecting a selected polarity reversal of said central office tip and ring conductors; and reversing means for effecting a corresponding polarity reversal of said subscriber tip and ring conductors in response to the detection of said selected polarity reversal by said reversal detector means.

4. The adapter circuit defined by claim 1 wherein said line conductors include central office tip and ring conductors connected to the central office facility and subscriber tip and ring conductors connected to the subscriber facility, said first means including a first relay connected to be energized in response to the presence of ground potential on said central office tip conductor.

5. The adapter circuit defined by claim 4, said second means connected to be enabled by the energization of said first relay circuit, said second means including a second relay connected to be energized in response to the interconnection of said subscriber tip and ring conductors at said subscriber facility once said second means is enabled.

6. The adapter circuit defined by claim 5 wherein said third means includes a third relay connected to be energized for selected lengths of time in response to the subscriber tip and ring conductors being interconnected at the subscriber facility.

7. The adapter circuit defined by claim 6 further including:

reversal detector means for detecting selected polarity reversals of said central office tip and ring conductors; and reversing means for effecting a corresponding polarity reversal of said subscriber tip and ring conductors in response to the detection of said polarity reversals by said reversal detector means.

8. The adapter circuit defined by claim 7 wherein said reversal detector means includes a fourth relay connected to be energized in response to the presence of ground potential on said central office ring conductor, said reversing means including cross connector means responsive to the energization of said fourth relay for reversing the polarity of said subscriber tip and ring conductors to have ground potential present on the subscriber ring conductor.

9. An adapter circuit for use with telephone systems including a central office station and a subscriber station each connected by a pair of tip and ring conductors to an intermediate device, the adapter circuit being connected across the intermediate device and to the tip and ring conductors of both said stations for effecting completion of an operating connection of said stations through said intermediate device in response to the transmission of ground start signals from either of said stations, said adapter circuit including:

central office means for detecting ground start signals transmitted from said central office station over a conductor connected thereto, said central office means effecting transmission of said ground start signals to said subscriber station;

subscriber means, responsive to operation of said central office means, for detecting interconnection of the tip and ring conductors at the subscriber station by operation thereof, said subscriber means completing said operating connection of said stations through said intermediate device; and tripping means, responsive to operation of said subscriber means, for interconnecting the tip and ring conductors of said central office station for a predetermined period of time.

10. The adapter circuit defined by claim 9 further including subscriber ground means for detecting ground start signals transmitted from said subscriber station over a conductor connected thereto, said subscriber ground means causing operation of said tripping means in response to detection of said ground start signals from said subscriber station.

11. The adapter circuit defined by claim 9 further including:

reversal detector means for detecting a selected polarity reversal of the tip and ring conductors connected to said central office station; and reversing means, responsive to the operation of said reversal detector means, for effecting a corresponding polarity reversal of the tip and ring conductors connected to the subscriber station.

12. The adapter circuit defined by claim 9 wherein said central office means includes a first relay circuit that is connected to be responsive to the application thereto of ground start signals from said central office station, said first relay circuit including means for enabling said ground start signals from said central office station to be provided to said subscriber station upon energization of said first relay circuit.

13. The adapter circuit defined by claim 12 wherein said subscriber means includes a second relay circuit that is connected to be energized in response to a subscriber station being operated to interconnect the tip and ring conductors connected thereto concurrently with operation of said central office means.

14. The adapter circuit defined by claim 13 wherein said tripping means includes a third relay circuit that is connected to be operated for a period of time controlled by operation of said second relay circuit, operation of said third relay circuit effecting interconnection of said tip and ring conductors connected to said central office station.

15. The adapter circuit defined by claim 14 further including subscriber ground means for detecting ground start signals transmitted from said subscriber station over a conductor connected thereto, said subscriber ground means causing operation of said tripping means in response to detection of said ground start signals from said subscriber station.

16. The adapter circuit defined by claim 15 wherein said subscriber ground means includes said third relay circuit and means for energizing said third relay circuit in response to ground start signals provided from said subscriber station.

17. The adapter circuit defined by claim 16 further including:

reversal detector means for detecting a selected polarity reversal of the tip and ring conductors connected to said central office station; and reversing means, responsive to operation of said reversal detector means, for effecting a polarity reversal of the tip and ring conductors connected to the subscriber station which polarity reversal corresponds to said selected polarity reversal of the tip and ring conductors connected to the central office station.

18. The adapter circuit defined by claim 17 wherein said reversal detector circuit includes a fourth relay circuit connected to be energized in response to the presence of ground potential on the ring conductor connected to the central office station, energization of said fourth relay circuit causing operation of said reversing means.

* * * * *